United States Patent
Kobori et al.

(10) Patent No.: US 10,054,328 B2
(45) Date of Patent: Aug. 21, 2018

(54) OPERATIONAL CONDITIONING BASED ON ENVIRONMENTAL COMPONENTS

(71) Applicants: Hiroko Kobori, Tokyo (JP); Tomoaki Gyota, Tokyo (JP); Masanori Nakata, Tokyo (JP)

(72) Inventors: Hiroko Kobori, Tokyo (JP); Tomoaki Gyota, Tokyo (JP); Masanori Nakata, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 398 days.

(21) Appl. No.: 14/759,674

(22) PCT Filed: Jan. 30, 2013

(86) PCT No.: PCT/JP2013/052034
§ 371 (c)(1),
(2) Date: Jul. 8, 2015

(87) PCT Pub. No.: WO2014/118909
PCT Pub. Date: Aug. 7, 2014

(65) Prior Publication Data
US 2015/0345817 A1    Dec. 3, 2015

(51) Int. Cl.
*F24F 11/30* (2018.01)
*G05B 15/02* (2006.01)
(Continued)

(52) U.S. Cl.
CPC ............. *F24F 11/30* (2018.01); *F24F 11/62* (2018.01); *G05B 15/02* (2013.01); *F24F 11/65* (2018.01); *G05B 2219/2642* (2013.01)

(58) Field of Classification Search
CPC . F24F 11/006; F24F 2011/0064; G05B 15/02; G05B 2219/2642
See application file for complete search history.

(56) References Cited

U.S. PATENT DOCUMENTS 7,295,119 B2 * 11/2007 Rappaport ............ G06F 17/509
340/5.8
7,295,960 B2 * 11/2007 Rappaport ............ G06F 17/509
455/403
(Continued)

FOREIGN PATENT DOCUMENTS

JP    2008-057951 A    3/2008
JP    2008-116061 A    5/2008
(Continued)

OTHER PUBLICATIONS

Taneja, J.; Krioukov, A.; Dawson-Haggerty, S. and Culler, D., "Enabling Advanced Environmental Conditioning with a Building Application Stack", 2013, IEEE.*
(Continued)

*Primary Examiner* — Mohammad Ali
*Assistant Examiner* — Kelvin Booker
(74) *Attorney, Agent, or Firm* — Posz Law Group, PLC

(57) ABSTRACT

A control device controls a plurality of equipment items for conditioning the environment in a room. The control device comprises an installation information memory and a space information memory configured to store information regarding the space the environment in which can be conditioned by each of the plurality of equipment items; a target setter configured to set a target location in the room and a target environment at the target location; a unit identifier configured to identify the equipment item that can condition the environment at the target location; and a controller configured to select one control pattern based on the power consumption when the control according to each control pattern is executed from among a plurality of control patterns for controlling the equipment item so as to condition the environment at the target location to the target environ-
(Continued)

ment and control the equipment item with the selected control pattern.

13 Claims, 15 Drawing Sheets

(51) Int. Cl.
*F24F 11/62* (2018.01)
*F24F 11/65* (2018.01)

(56) References Cited

U.S. PATENT DOCUMENTS

| | | | | |
|---|---|---|---|---|
| 7,961,094 B2* | 6/2011 | Breed | ............... | G08B 13/1663 |
| | | | | 340/541 |
| 8,310,363 B2* | 11/2012 | Breed | ............... | B60N 2/002 |
| | | | | 340/539.13 |
| 8,384,538 B2* | 2/2013 | Breed | ............... | B60C 11/24 |
| | | | | 340/10.33 |
| 8,410,945 B2* | 4/2013 | Breed | ............... | B60N 2/4829 |
| | | | | 340/580 |
| 8,482,399 B2* | 7/2013 | Breed | ............... | G06Q 10/06 |
| | | | | 340/500 |
| 8,494,762 B2* | 7/2013 | Patel | ............... | G01C 21/206 |
| | | | | 340/539.11 |
| 8,791,417 B2* | 7/2014 | Scelzi | ............... | G01K 17/20 |
| | | | | 250/338.1 |
| 8,831,757 B2* | 9/2014 | Kuroiwa | ............... | F24F 11/006 |
| | | | | 236/51 |
| 9,030,321 B2* | 5/2015 | Breed | ............... | B60T 1/005 |
| | | | | 340/539.17 |
| 2008/0015740 A1* | 1/2008 | Osann, Jr. | ............... | G05B 15/02 |
| | | | | 700/276 |
| 2010/0010680 A1 | 1/2010 | Nishino et al. | | |
| 2011/0093121 A1 | 4/2011 | Wakuta et al. | | |
| 2011/0093126 A1* | 4/2011 | Toba | ............... | G05B 15/02 |
| | | | | 700/291 |
| 2012/0065789 A1* | 3/2012 | Scelzi | ............... | G01K 17/20 |
| | | | | 700/291 |
| 2012/0247748 A1* | 10/2012 | Mise | ............... | F24F 11/0001 |
| | | | | 165/237 |
| 2013/0166074 A1 | 6/2013 | Hattori et al. | | |
| 2013/0166081 A1* | 6/2013 | Sanders | ............... | G05B 11/01 |
| | | | | 700/286 |
| 2013/0204439 A1* | 8/2013 | Scelzi | ............... | G06Q 10/00 |
| | | | | 700/276 |
| 2014/0081467 A1 | 3/2014 | Sato | | |
| 2015/0094968 A1* | 4/2015 | Jia | ............... | G06Q 40/04 |
| | | | | 702/60 |

FOREIGN PATENT DOCUMENTS

| | | |
|---|---|---|
| JP | 2009-174734 A | 8/2009 |
| JP | 2010-127542 A | 6/2010 |
| JP | 2011-052958 A | 3/2011 |
| JP | 2011-075133 A | 4/2011 |
| JP | 2011-089683 A | 5/2011 |
| JP | 2011-226767 A | 11/2011 |
| JP | 2011-247515 A | 12/2011 |
| JP | 2012-007813 A | 1/2012 |
| JP | 2012-033416 A | 2/2012 |
| JP | 2012-164517 A | 8/2012 |
| WO | 2012/035788 A1 | 3/2012 |
| WO | 2012/172595 A1 | 12/2012 |

OTHER PUBLICATIONS

Office Action dated Mar. 29, 2016 in the corresponding JP application No. 2014-559407 (with partial English translation).
International Search Report of the International Searching Authority dated Apr. 16, 2013 for the corresponding international application No. PCT/JP2013/052034 (and English translation).

* cited by examiner

FIG.7

| PRIORITY RANK | CONTROL PATTERN | | ASSOCIATED PATTERN | | EXECUTION CONDITION | |
|---|---|---|---|---|---|---|
| | CONTROL ITEM | CONTROL DETAILS | CONTROL ITEM | CONTROL DETAILS | CONDITION ITEM | UNIT STATE |
| 1 | OPERATION | OFF → ON | FAN STRENGTH | min | OPERATION | OFF |
| 2 | MODE | FAN | SET TEMPERATURE | AIR CONDITIONING MAX | FAN STRENGTH | not MAX |
| 3 | FAN STRENGTH +1 | | — | — | MODE | FAN |
| | MODE | FAN → AIR CONDITIONING | FAN STRENGTH | min | | |
| | | | SET TEMPERATURE | AIR CONDITIONING MAX | | |
| 4 | SET TEMPERATURE −1 | | FAN STRENGTH | min | SET TEMPERATURE | not min |
| ... | ... | ... | ... | ... | ... | ... |

FIG.11

| PRIORITY RANK | CONTROL PATTERN | | EXECUTABLE OR NOT | |
| --- | --- | --- | --- | --- |
| | CONTROL ITEM | CONTROL DETAILS | UNIT ID "i23" | UNIT ID "i24" |
| 1 | OPERATION | OFF → ON | ○ | |
| | MODE | FAN | | |
| 2 | FAN STRENGTH | FAN STRENGTH + 1 | ○ | |
| 3 | MODE | FAN → AIR CONDITIONING | ○ | ○ |
| 4 | SET TEMPERATURE | SET TEMPERATURE − 1 | ○ | ○ |
| ⋮ | ⋮ | ⋮ | ⋮ | ⋮ |

532 — CONTROL PATTERN
533 — CONTROL DETAILS

FIG.13

| TARGET LOCATION | USER REQUEST | TARGET ENVIRONMENT | REGISTRATION TIME |
|---|---|---|---|
| {1, 2} | WARMER | FEELS LIKE TEMPERATURE 29 °C OR HIGHER | 12:03 |
| {3, 0} | COOLER | FEELS LIKE TEMPERATURE 26 °C OR LOWER | 12:09 |
| {4, 1} | COOLER | FEELS LIKE TEMPERATURE 26 °C OR LOWER | 12:10 |
| {3, 2} | COOLER | FEELS LIKE TEMPERATURE 26 °C OR LOWER | 12:17 |

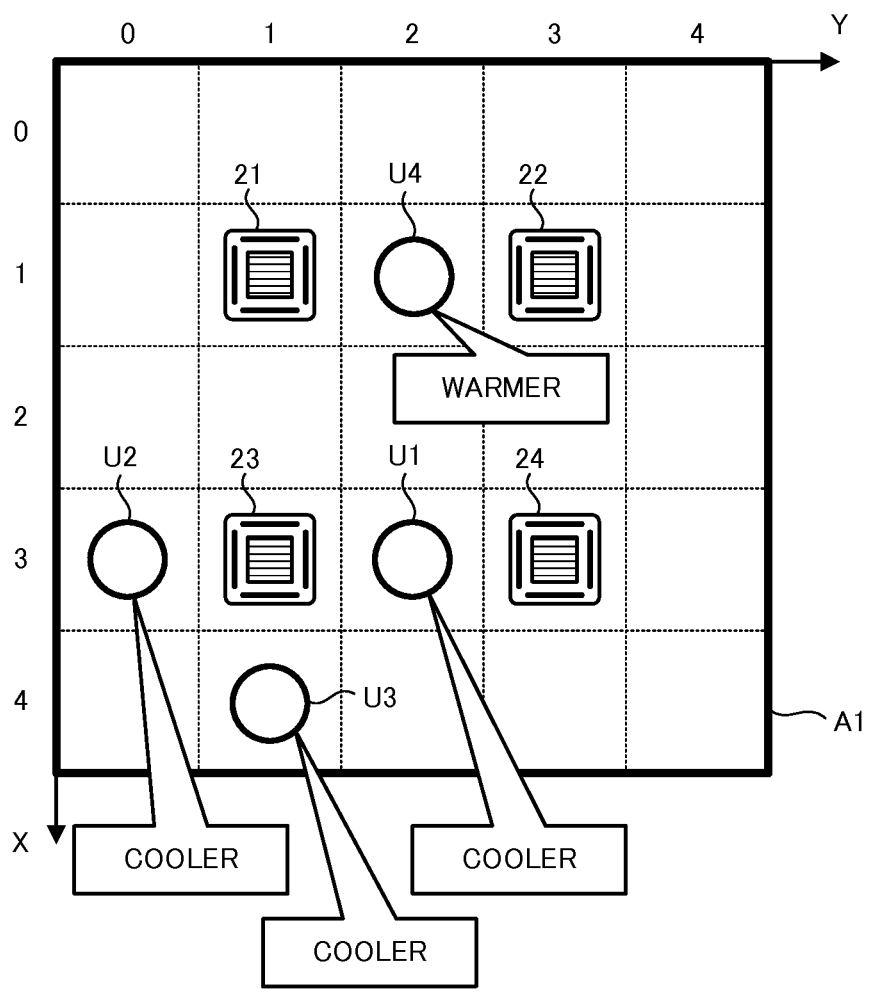

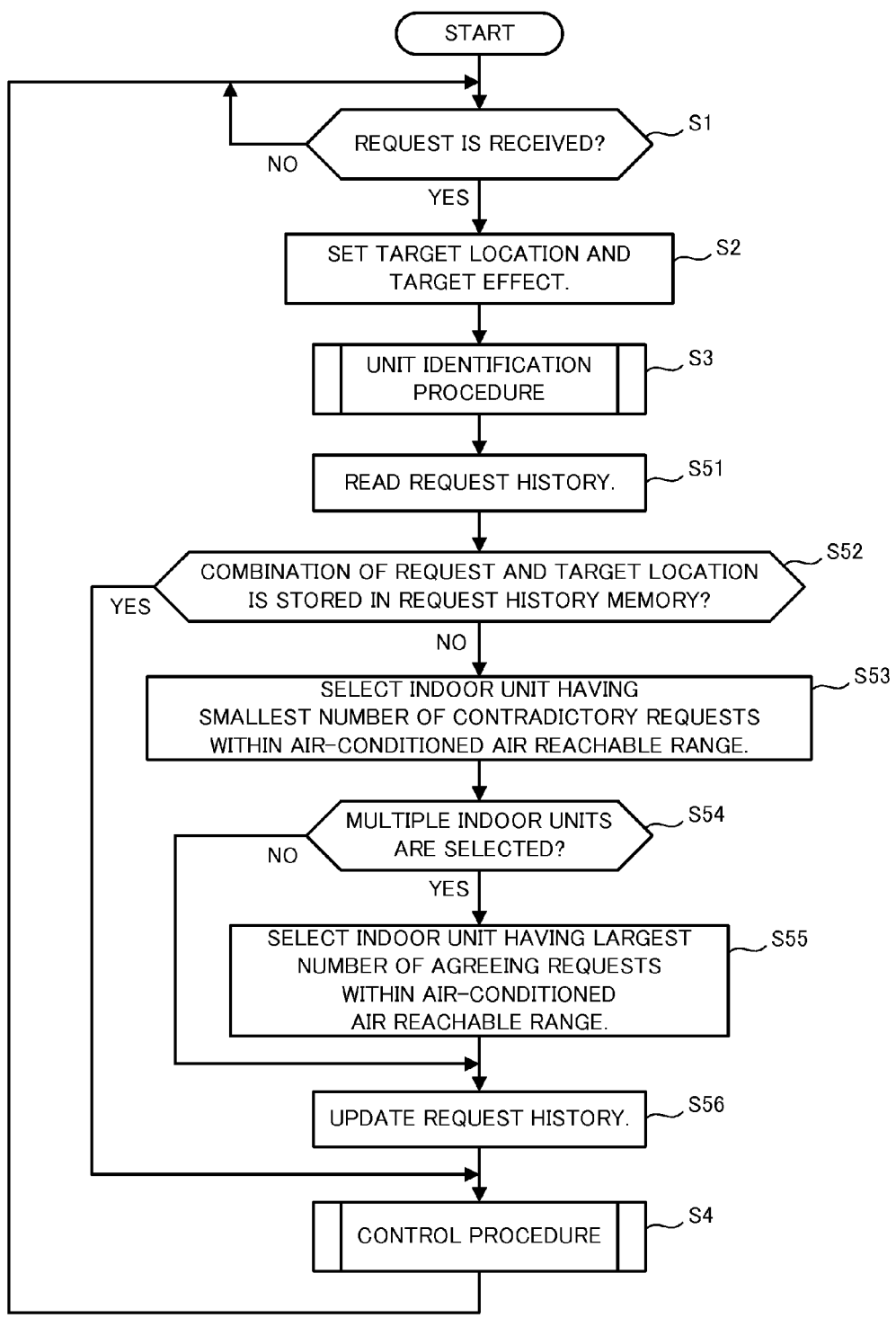

OPERATIONAL CONDITIONING BASED ON ENVIRONMENTAL COMPONENTS

CROSS REFERENCE TO RELATED APPLICATION

This application is a U.S. national stage application of PCT/JP2013/052034 filed on Jan. 30, 2013, the contents of which are incorporated herein by reference.

TECHNICAL FIELD

The present disclosure relates to a control device, control system, control method, and program.

BACKGROUND ART

In order to condition the environment in a building such as a store or office, equipment items such as air-conditioning units and lighting fittings are installed in the building. The equipment items generally operate according to user instructions entered via a terminal or the like. Furthermore, in recent years, a system including multiple equipment items and a control device controlling the equipment items via a network may be installed. The control device in such a system executes control using several schemes.

For example, the control device receives a request such as "cooler" or "remove moisture" from the user and controls the equipment item to fulfill the request. Alternatively, the control device can use sensors measuring the temperature, humidity, carbon dioxide concentration, and the like and controls the equipment item to make the user feel more comfortable.

With the use of either of the above schemes, the equipment items presumably waste more energy if the environment in the entire space of a building is conditioned. Techniques for reducing the wasted energy have been proposed (for example, see Patent Literature 1 and 2).

The system described in the Patent Literature 1 displays to each of multiple users requests received from the other users. Consequently, each user is expected to make a request in consideration of how the other users feel. Then, the energy can further be saved.

The system described in the Patent Literature 2 detects the locations of the user and obstacles in the room. The system selects and controls the equipment item with the lowest degree of reduction in the environment conditioning range caused by the obstacle between the equipment and the user. Consequently, the environment around the user can be conditioned without interference by the obstacle.

CITATION LIST

Patent Literature

Patent Literature 1: Unexamined Japanese Patent Application Kokai Publication No. 2012-007813; and
Patent Literature 2: Unexamined Japanese Patent Application Kokai Publication No. 2012-033416.

SUMMARY OF INVENTION

Technical Problem

When multiple equipment items are installed in a room that is not divided by partitions, there may be some areas where the environment conditioning ranges of equipment items overlap with each other. If an appropriate equipment item is not used to condition the environment among the equipment items that can condition the environment in such an area, the energy may be wasted. However, the system described in the Patent Literature 1 does not condition the environment using an appropriate equipment item.

On the other hand, the system described in the Patent Literature 2 selects an equipment item conditioning the environment around the user based on the locations of the obstacles. However, this system does not take into account the energy consumption in controlling the selected equipment item. Thus, presumably, there is room for further reducing the energy consumption.

The present disclosure is made with the view of the above circumstance and an objective of the disclosure is to reduce the energy consumption in controlling the equipment items.

Solution to Problem

In order to achieve the above objective, the control device according to the present disclosure is a control device for controlling a plurality of equipment items for conditioning the environment in a room, comprising:

first storage means for storing information regarding the space the environment in which can be conditioned by each of the plurality of equipment items;

setting means for setting a target location in the room and a target environment at the target location;

identification means for identifying the equipment item that can condition the environment at the target location based on the information stored in the first storage means; and control means for selecting one control pattern based on the power consumption when the control according to each control pattern is executed from among a plurality of control patterns for controlling the equipment item identified by the identification means so as to condition the environment at the target location to the target environment and controlling the equipment item identified by the identification means with the selected control pattern.

Advantageous Effects of Invention

The present disclosure can reduce the energy consumption in controlling the equipment items.

BRIEF DESCRIPTION OF DRAWINGS

FIG. 7 is an illustration showing an example of control rules;

FIG. 11 is an illustration for explaining executable control patterns among multiple control patterns;

FIG. 13 is an illustration showing an example of request history;

FIG. 14 is an illustration showing the users' locations and requests in an indoor space; and FIG. 15 is a flowchart showing a series of processing executed by the control device.

DESCRIPTION OF EMBODIMENTS

Embodiments of the present disclosure are described in detail hereafter with reference to the drawings.

(Embodiment 1)

Figure 1:
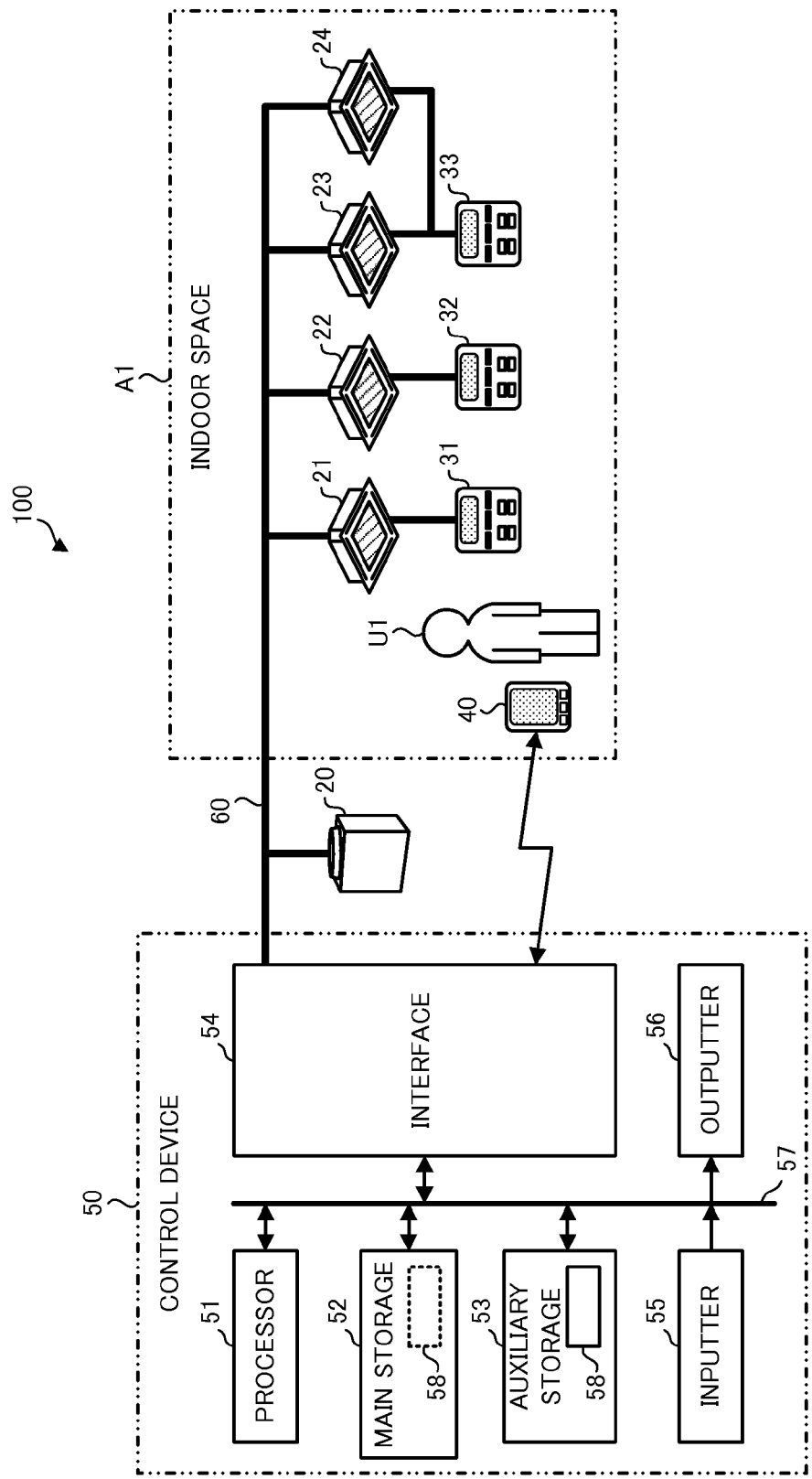
FIG. 1 is a block diagram showing the configuration of the control system according to Embodiment 1.

FIG. 1 shows the configuration of a control system 100 according to this embodiment. The control system 100 is an air conditioning system conditioning the environment in an indoor space A1 by controlling indoor units 21, 22, 23, and 24. In this embodiment, the air state as the environment in the indoor space A1 is conditioned. Moreover, the indoor space A1 is, for example, a room in which a user U1 of the control system 100 lives.

The control system 100 comprises an outdoor unit 20, indoor units 21 to 24, operation terminals 31, 32, and 33, a portable terminal 40, and a control device 50. The outdoor unit 20 and indoor units 21 to 24 are connected to the control device 50 via a communication network 60 indicated by the solid lines.

The indoor units 21 to 24 are each, for example, an air-conditioning unit installed on the ceiling of the indoor space A1 and connected to the outdoor unit 20 via a refrigerant pipe. The indoor units 21 to 24 all have sensors measuring the room temperature and humidity and an outlet for discharging the air-conditioned air in four directions. The indoor units 21 to 24 discharge the air-conditioned air of a given temperature and humidity in a given air direction with a given air rate according to commands output from the operation terminals 31 to 33 and control device 50 to condition the air state in the indoor space A1.

The operation terminals 31 and 32 are terminals for operating the indoor units 21 and 22, respectively. The operation terminal 33 is a terminal for operating the indoor units 23 and 24. The user U1 enters information into the operation terminals 31 to 33 to operate the indoor units 21 to 24.

The portable terminal 40 is, for example, a tablet terminal carried by the user U1. The portable terminal 40 has built-in sensors measuring the room temperature and humidity. Furthermore, the portable terminal 40 calculates the location of the portable terminal 40 in the indoor space A1 based, for example, on the transfer time of electromagnetic waves propagating to/from the control device 50 or electromagnetic waves propagating to/from an antenna installed in the indoor space A1.

Then, as the user U1 enters a request, the portable terminal 40 sends a command including various kinds of information to the control device 50 through wireless communication. The command sent to the control device 50 includes, for example, measurement results of the sensors, location information of the portable terminal 40, and the air state requested by the user U1.

The control device 50 controls each of the indoor units 21 to 24 based on the request of the user U1. The control device 50 comprises a processor 51, a main storage 52, an auxiliary storage 53, an interface 54, an inputter 55, and an outputter 56. The main storage 52, auxiliary storage 53, interface 54, inputter 55, and outputter 56 are all connected to the processor 51 via an internal bus 57.

The processor 51 comprises, for example, a CPU (central processing unit). The processor 51 executes a program 58 stored in the auxiliary storage 53 to execute the procedures described later. Furthermore, the main storage 52 comprises, for example, a RAM (random access memory). The main storage 52 loads the program 58 from the auxiliary storage 53. Then, the main storage 52 is used as the work area of the processor 51.

The auxiliary storage 53 is configured to include a non-volatile memory such as a flash memory. The auxiliary storage 53 stores data such as parameters used in the processing of the processor 51 in addition to the program 58. The auxiliary storage 53 supplies data for the processor 51 to use to the processor 51 and stores data supplied from the processor 51 according to instructions of the processor 51.

The interface 54 comprises a communication interface for communication via the communication network 60, a communication interface for wireless communication with the portable terminal 40, and the like. The interface 54 relays the communication between the processor 51 and indoor units 21 to 24 and relays the communication between the processor 51 and portable terminal 40.

The inputter 55 comprises operation keys or the like for the administrator of the control device 50 to enter information. The inputter 55 notifies the processor 51 of the entered information. The outputter 56 comprises a liquid crystal display or the like for presenting information to the administrator of the control device 50. The outputter 56 displays given characters and figures to the administrator according to instructions of the processor 51.

Figure 2:
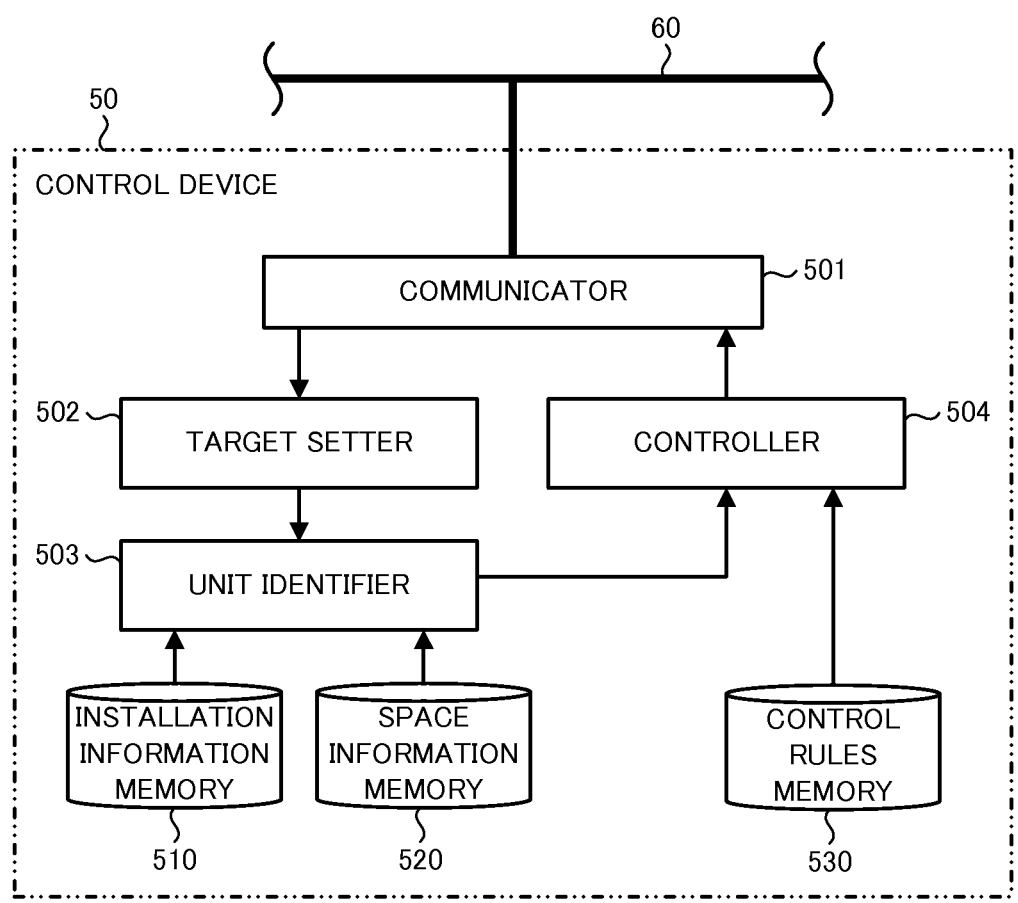
FIG. 2 is a block diagram showing the functions of the control device.

The processor 51, main storage 52, auxiliary storage 53, interface 54, inputter 55, and outputter 56 cooperate to realize various functions of the control device 50. The control device 50 functionally comprises, as shown in FIG. 2, a communicator 501, a target setter 502, a unit identifier 503, a controller 504, an installation information memory 510, a space information memory 520, and control rules memory 530.

The communicator 501 transmits/receives commands to/from the indoor units 21 to 24 and portable terminal 40. The communicator 501 interprets and notifies the target setter 502 of information contained in a command transmitted from the portable terminal 40. Furthermore, the communicator 501 creates a command from information notified from the controller 504 and sends the command to the indoor units 21 to 24 via the communication network 60.

The target setter 502 sets a target location and target environment for fulfilling a request based on the request of the user U1 notified from the portable terminal 40. The target location is the location of the portable terminal 40 in the indoor space A1 and substantially corresponds to the location of the user U. The target environment is the air state requested by the user U1. For example, if the user U1 requests "cooler" when the room temperature is 28° C., the target setter 502 sets the air state leading to a feels like temperature of 26° C. or lower at the target location as the target environment.

The unit identifier 503 makes reference to the installation information memory 510 and space information memory 520 and identifies the indoor unit that can condition the air state at the target location.

Figure 3:
FIG. 3 is an illustration showing the installation information.

The installation information memory 510 stores installation information 511 regarding the placement of the indoor units 21 to 24. The installation information 511 is, as shown in FIG. 3, data associating a unit ID 512, a unit class 513, an installation position 514, and an installation direction 515 with each other.

The unit ID 512 is information for identifying each of the indoor units 21 to 24. As shown in FIG. 3, the unit ID of the indoor unit 21 is "i21," the unit ID of the indoor unit 22 is "i22," the unit ID of the indoor unit 23 is "i23," and the unit ID of the indoor unit 24 is "i24." The unit ID 512 is used as information indicating the transmission destination and source of a command transferred on the communication network 60.

The unit class 513 is a class for classifying the range within which the indoor units 21 to 24 can condition the air state. The indoor units 21 to 24 are all classified into a unit class 513 "four-direction air discharge indoor unit."

The installation position 514 presents the position in the indoor space A1 at which each of the indoor units 21 to 24 is installed by X-Y coordinate values {X, Y}. As shown in the overhead view of FIG. 4, the indoor space A1 is divided into 25 sections. Then, the indoor units 21 to 24 are installed in the sections shown in FIG. 4.

The installation direction 515 presents the direction in which the installed indoor units 21 to 24 face by a vector having components X and Y, {X, Y}. The indoor units 21 to 24 are all installed so as to face in the reference direction {1, 0}.

Figure 5:
FIG. 5 is an illustration showing the space information.

Furthermore, the space information memory 520 stores space information 521. The space information 521 is, as shown in FIG. 5, data associating a unit class 513 and a conditioning space 523.

Provided that an indoor unit classified into the unit class 513 is installed at the origin {0, 0} so as to face in the direction {1, 0}, the conditioning space 523 presents the reachable range of the air-conditioned air discharged from the indoor unit. For example, {{1, 0}, 1} means that the air-conditioned air can be discharged over only one section in the direction {1, 0}.

Figure 6:
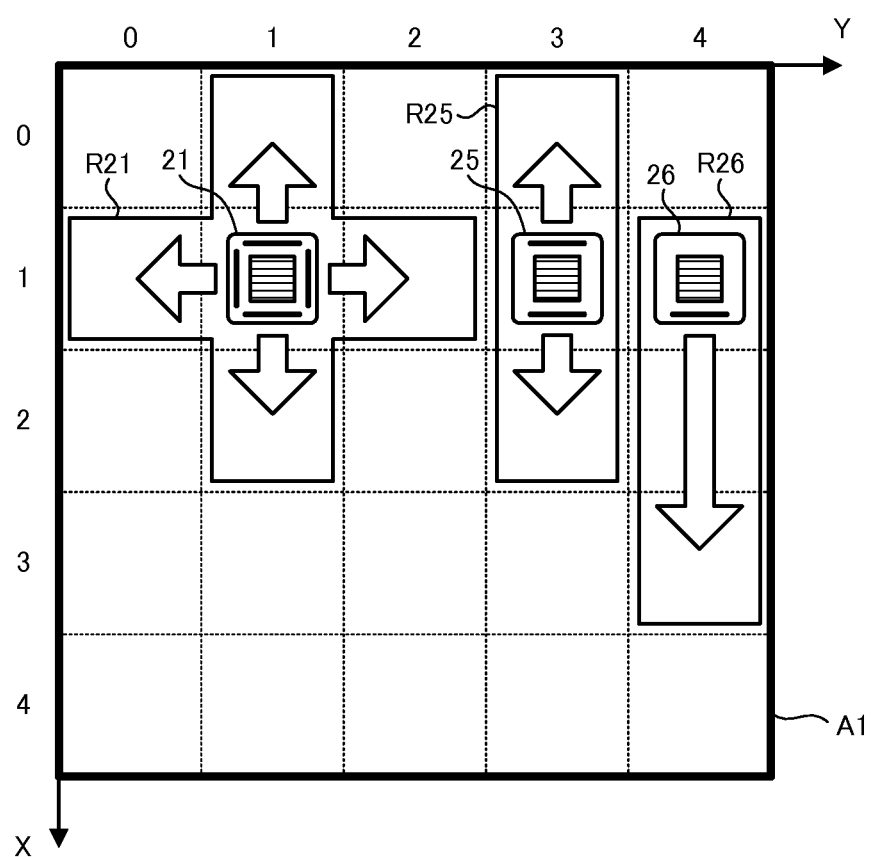
FIG. 6 is an illustration for explaining the conditioning space.
Figure 8:
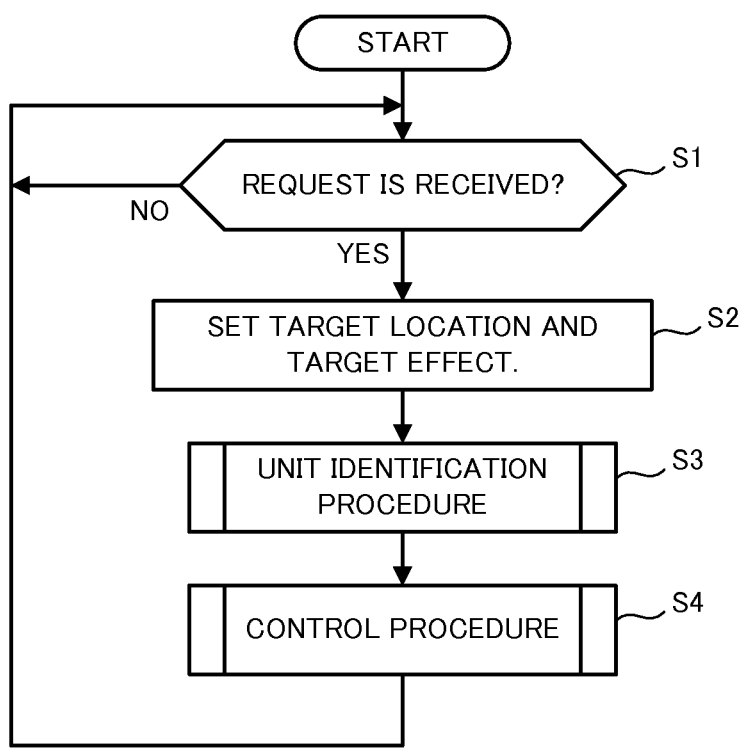
FIG. 8 is a flowchart showing a series of processing executed by the control device.

FIG. 6 shows an example of reachable ranges of the air-conditioned air discharged from the indoor units 21, 25, and 26 of different unit classes. A space R21 shown in FIG. 6 is the reachable range of the air-conditioned air from the indoor unit 21 that is a "four-direction discharge indoor unit." Furthermore, a space R25 is the air-conditioned air reachable range when the indoor unit 25 that is a "two-direction discharge indoor unit" is installed at the position {1, 3} so as to face in the direction {1, 0}. Moreover, a space R26 is the air-conditioned air reachable range when the indoor unit 26 that is a "one-direction discharge indoor unit" is installed at the position {1, 4} so as to face in the direction {1, 0}.

Returning to FIG. 2, the controller 504 makes reference to the control rules memory 530. Furthermore, the controller 504 selects and controls one indoor unit from among the indoor units identified by the unit identifier 503.

The control rules memory 530 stores, for example, control rules 531 shown in FIG. 7. The control rules 531 are data associating a priority rank 532, a control pattern 533, an associated pattern 534, and an execution condition 535. The control rules 531 include a list of control patterns 533 for fulfilling a request "cooler."

The priority rank 532 is a rank given to each of the control patterns 533 in the ascending order of increase in the power consumption when the control according to the control pattern 533 is executed. For example, when the indoor units 21 to 24 are controlled according to the control pattern 533 having the priority rank 532 of "1," increase in the power consumption is minimized.

The control pattern 533 presents the details of control for realizing the target environment. The control pattern 533 comprises a control item and control details. The control item means the type of a parameter to be controlled. The control details mean the parameter value set in the control. For example, the control pattern 533 comprising a control item "set temperature" and control details "set temperature −1" means that the set temperature of an indoor unit is lowered by 1° C.

The associated pattern 534 presents the details of control to be executed in addition to the control according to the control pattern 533 in order to prevent excessive increase in the power consumption. The associated pattern 534 comprises a control item and control details like the control pattern 533.

For example, the associated pattern 534 associated with the priority rank 532 of "3" means that the fan strength is controlled to the minimum (min) and the set temperature is controlled to the highest air-conditioning temperature (MAX). This associated pattern 534 prevents the air-conditioning performance from being excessively increased.

The execution condition 535 presents a condition for executing the control according to the control pattern 533. The execution condition 535 comprises a condition item and a unit state. The condition item means the type of a parameter to determine the condition. The unit state means the states (parameter values) of the indoor units 21 to 24 when the condition is satisfied.

When the actual states of the indoor units 21 to 24 are different from the unit state, the execution condition 535 is not satisfied and therefore the control according to the control pattern 533 is not executed. For example, when the operation state of the indoor unit 21 is OFF, the indoor unit 21 cannot be controlled according to the control pattern 533 having the priority rank 532 of "1."

Subsequently, a series of processing executed by the control device 50 will be described using FIGS. 8 to 11. The series of processing shown in FIG. 8 starts when the control device 50 is powered on.

First, the communicator 501 determines whether a request of the user U1 is received from the portable terminal 40 (Step S1). If no request is received (Step S1; No), the communicator 501 repeats the determination in the Step S1.

On the other hand, if a request is received (Step S1; Yes), the target setter 502 sets a target location and a target effect (Step S2). For example, the target setter 502 sets the location {3, 2} of the user U1 shown in FIG. 4 as the target location. Furthermore, in order to fulfill the request "cooler" from the user U1, the target setter 502 sets the air state leading to a feels like temperature of 26° C. or lower as the target environment.

Figure 9:
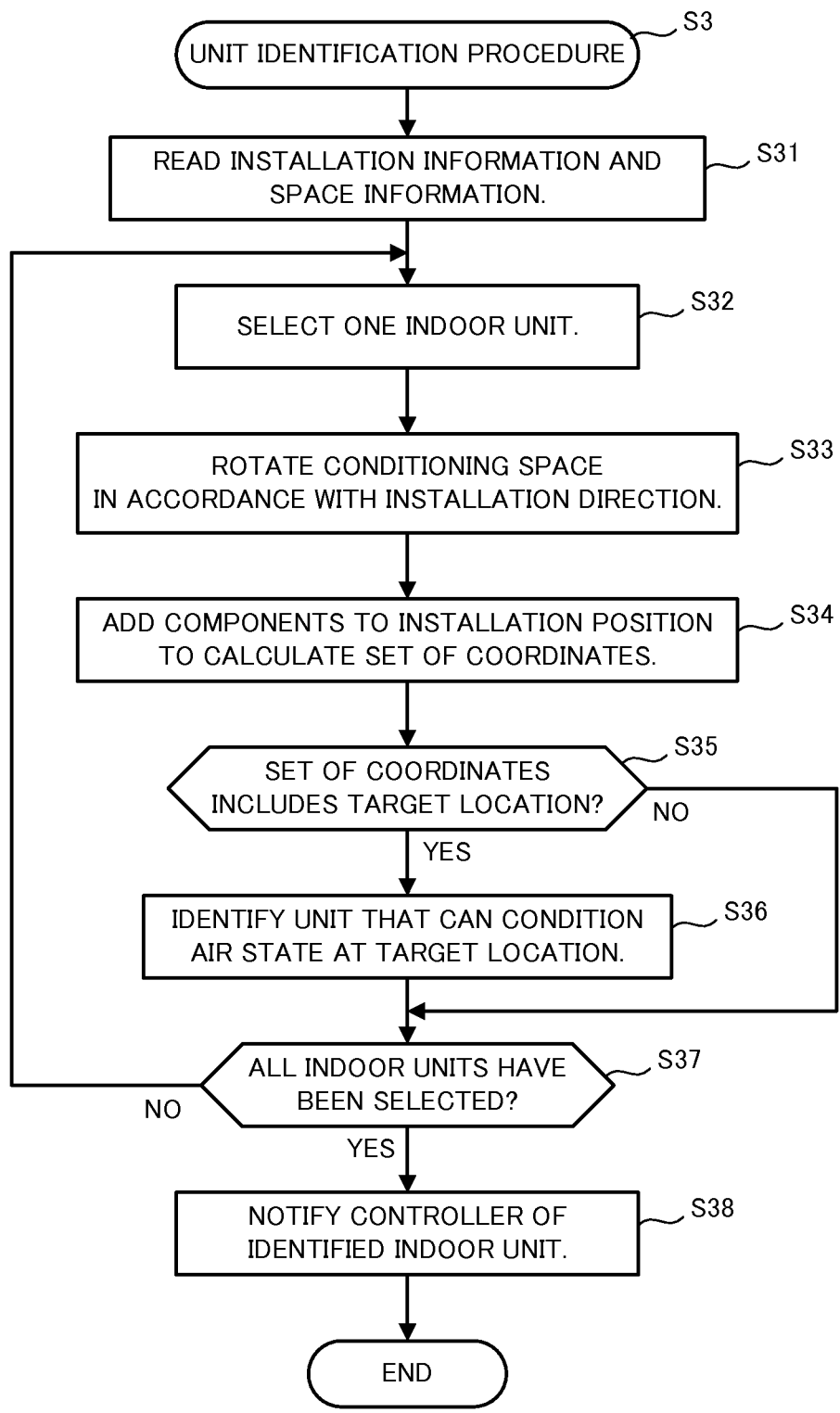
FIG. 9 is a flowchart showing the unit identification procedure.

Then, the unit identifier 503 executes the unit identification procedure (Step S3). In the unit identification procedure, the indoor unit that can discharge the air-conditioned air to the target location is identified. FIG. 9 shows the processing executed in the unit identification procedure.

As shown in FIG. 9, in the unit identification procedure, the unit identifier 503 first reads the installation information 511 and space information 521 (Step S31).

Then, the unit identifier 503 selects one of the indoor units 21 to 24 that has not been selected (Step S32).

Then, the unit identifier 503 rotates the conditioning space 523 corresponding to the unit class 513 of the selected indoor unit in accordance with the installation direction 515 of this indoor unit (Step S33). Here, since the installation directions 515 of the indoor units 21 to 24 according to this embodiment are all the reference direction {1, 0}, there is no need of rotating the conditioning space 523.

Then, the unit identifier 503 calculates a set of coordinates by adding the direction components shown in the conditioning space 523 to the installation position 514 (Step S34). The set of coordinates presents the space in which the air state is conditioned by the indoor unit selected in the Step S32. For example, if the indoor unit 23 is selected in the Step S32, the unit identifier 503 calculates a set of coordinates {{3, 1}, {4, 1}, {2, 1}, {3, 2}, {3, 0}}.

Then, the unit identifier 503 determines whether the calculated set of coordinates includes the target location (Step S35). If the set of coordinates does not include the target location (Step S35; No), the unit identifier 503 advances the processing to the Step S37.

On the other hand, if the set of coordinates includes the target location (Step S35; Yes), the unit identifier 503 identifies the selected indoor unit as the unit that can condition the air state at the target location (Step S36).

Then, the unit identifier 503 determines whether all indoor units 21 to 24 have been selected (Step S37). If not all indoor units 21 to 24 have been selected (Step S37; No), the unit identifier 503 repeats the processing of the Step S32 and subsequent steps.

Figure 4:
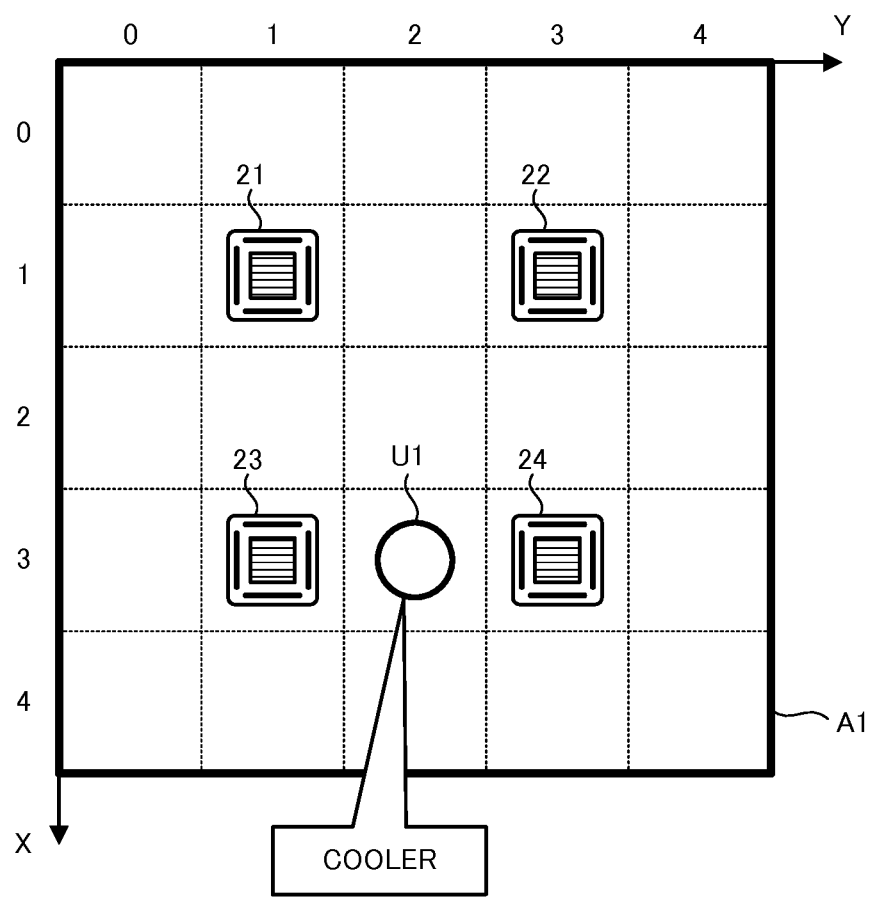
FIG. 4 is an illustration showing the positions of indoor units in an indoor space.

On the other hand, if all indoor units 21 to 24 have been selected (Step S37; Yes), the unit identifier 503 notifies the controller 504 of the identified indoor units (Step S38). For example, as shown in FIG. 4, when the target location is {3, 2}, the unit identifier 503 identifies the indoor units 23 and 24 and notifies the controller 504 of the indoor units 23 and 24 as the units that can discharge the air-conditioned air to the target location.

Subsequently, the unit identifier 503 ends the unit identification procedure.

Figure 10:
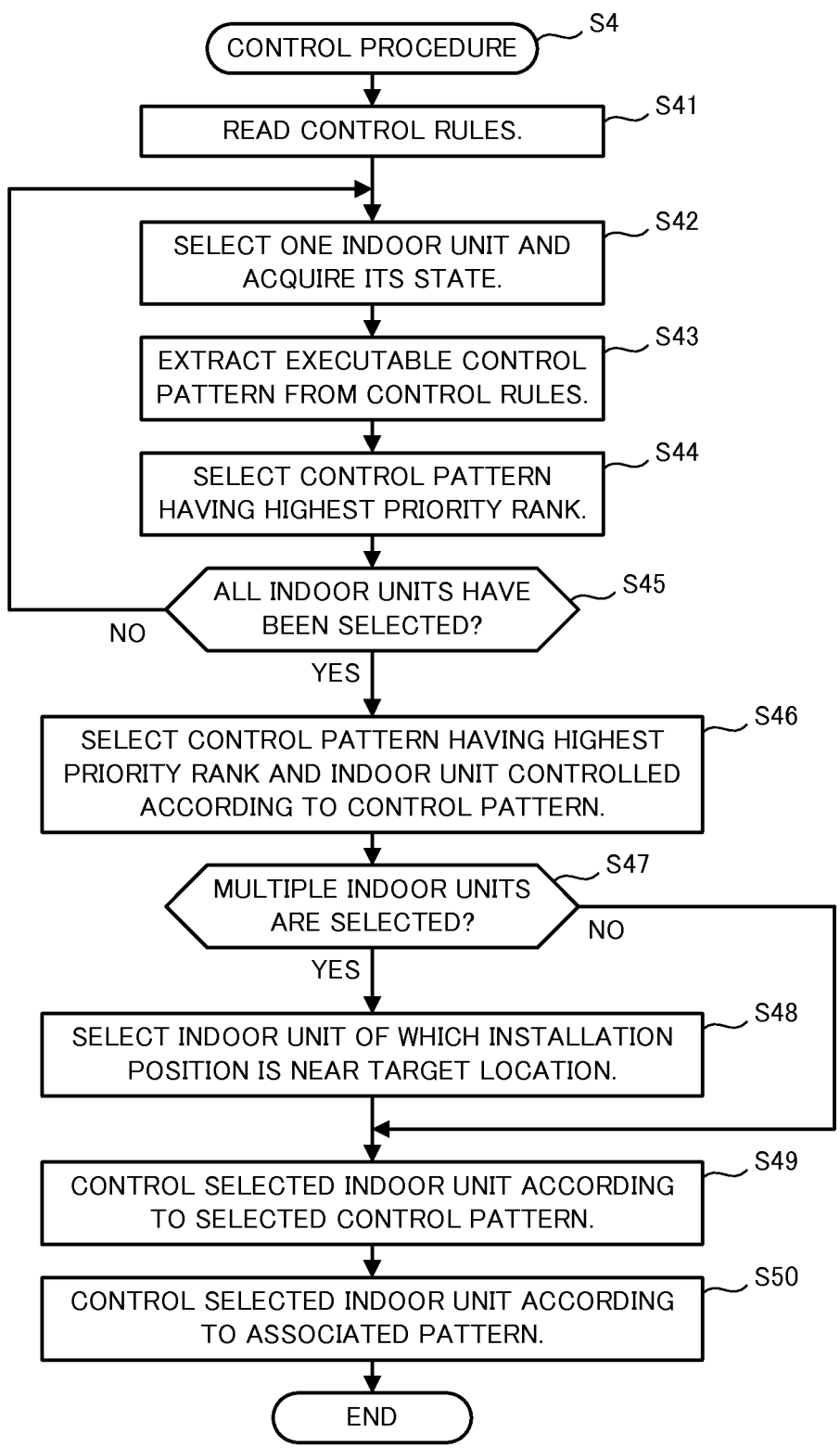
FIG. 10 is a flowchart showing the control procedure.

Returning to FIG. 8, following the unit identification procedure (Step S3), the controller 504 executes the control procedure (Step S4). In the control procedure, the controller 504 selects one indoor unit from among the indoor units identified in the unit identification procedure and controls the indoor unit with a given control pattern so as to lower increase in the power consumption. Consequently, the target environment at the target location can be realized with low power consumption. FIG. 10 shows the processing executed in the control procedure.

As shown in FIG. 10, the controller 504 first reads the control rules from the control rules memory 530 (Step S41). For example, when the user U1 has requested "cooler," the controller 504 reads the control rules 531 including a list of control patterns 533 for fulfilling the request.

Then, the controller 504 selects one indoor unit and acquires its state (Step S42). More specifically, the controller 504 selects one indoor unit that has not been selected from among the indoor units identified in the unit identification procedure. Then, the controller 504 acquires the state of the selected indoor unit via the communication network 60.

Then, the controller 504 extracts an executable control pattern 533 from the control rules 531 (Step S43). More specifically, the controller 504 determines whether the state of the indoor unit satisfies the execution condition 535 to extract the control pattern 533 according to which the control is executable. In FIG. 11, the control patterns 533 according to which the control is executable are indicated by circles with respect to the indoor units 23 and 24.

Then, the controller 504 selects the control pattern 533 having the highest priority rank 532 (Step S44). For example, as seen with reference to FIG. 11, when the indoor unit 23 is selected in the Step S42, the controller 504 selects the control pattern 533 having the priority rank 532 of "1." Furthermore, when the indoor unit 24 is selected in the Step S42, the controller 504 selects the control pattern 533 having the priority rank 532 of "3."

Then, the controller 504 determines whether all indoor units 21 to 24 have been selected (Step S45). If not all indoor units 21 to 24 have been selected (Step S45; No), the controller 504 repeats the processing of the Step S42 and subsequent steps.

On the other hand, if all indoor units 21 to 24 have been selected (Step S45: Yes), the controller 504 selects the control pattern 533 having the highest priority rank 532 and the indoor unit controlled according to that control pattern 533 (Step S46). For example, the controller 504 selects the control pattern 533 having the priority rank 532 of "1" and the indoor unit 23.

Then, the controller 504 determines whether multiple indoor units are selected in the Step S46 (Step S47). If multiple indoor units are not selected (Step S47; No), the controller 504 advances the processing to Step S49.

On the other hand, if multiple indoor units are selected (Step S47; Yes), the controller 504 selects the indoor unit of which the installation position 514 is the nearest to the target location (Step S48). Consequently, one indoor unit is selected.

Then, the controller 504 controls the indoor unit selected in the Step S46 according to the control pattern 533 selected in the Step S46 (Step S49). For example, the controller 504 controls the indoor unit 23 according to the control pattern 533 having the priority rank 532 of "1." More specifically, the controller 504 sends a given command to the indoor unit 23 via the communicator 501 to control the indoor unit 23.

Consequently, the air state at the target location is conditioned to the target environment. Here, if the determination in the Step S47 is affirmative, the indoor unit selected in the Step S48 is controlled.

Then, the controller 504 controls the indoor unit selected in the Step S46 according to the associated pattern 534 (Step S50). The associated pattern 534 is a pattern associated with the control pattern 533 selected in the Step S46.

Subsequently, the controller 504 ends the control procedure. Returning to FIG. 8, following the control procedure (Step S4), the control device 50 repeats the processing of the Step S1 and subsequent steps.

As described above, the control device 50 according to this embodiment realizes the target environment at the target location. Consequently, the user U1 can feel more comfortable.

Furthermore, the control device 50 selects the indoor unit 23 from among the indoor units 23 and 24 that can condition the air state at the target location so as to lower increase in the power consumption. Furthermore, the control device 50 selects one control pattern 533 from among multiple control patterns 533 so as to lower increase in the power consumption and controls the indoor unit 23 according to the selected control pattern 533. Consequently, the control device 50 can reduce the total power consumption of the units installed in the indoor space A1 compared with, for example, when the indoor units 21 to 24 are all equally controlled.

Furthermore, the control device 50 calculates the reachable range of the air-conditioned air discharged from each of the indoor units 21 to 24 based on the installation information 511 and space information 521. Consequently, for example when the models of the indoor units 21 to 24 are changed, the control system 100 can be reconfigured simply by rewriting the installation information 511 or space information 521. Thus, the configuration of the control system 100 can easily be corrected.

Furthermore, the control device 50 selects the indoor unit 23 and control pattern 533 using the control rules 531. Generally, change in the power consumption of an air-conditioning unit such as an indoor unit largely depends on the environment and/or the operation state of the entire refrigerant system. Therefore, it is difficult to calculate the change and a large amount of calculation is required to calculate the change.

However, in this embodiment, the control pattern 533 is preliminarily given the priority rank 532 in accordance with increase in the power consumption. Then, the control device 50 controls the indoor unit 23 according to the priority rank 532. Consequently, the control causing small increase in the power consumption can be executed with a very small amount of calculation.

Furthermore, the controller 504 executes control according to the associated pattern 534 along with the control according to the control pattern 533. Consequently, abrupt increase in the power consumption can be prevented.

Furthermore, multiple indoor units may be selected in the Step S46 provided that several control patterns 533 having the same priority rank 532 are executable. However, using the distance between the installation position 514 and target location, the controller 504 eventually selects and controls one indoor unit. Consequently, one indoor unit can be selected for sure.

(Embodiment 2)

Embodiment 2 will be described hereafter mainly in regard to the difference from the above-described Embodiment 1. The same or equivalent components as or to those in the above-described embodiment are referred to by the equivalent reference numbers and their explanation will be omitted or simplified.

Figure 12:
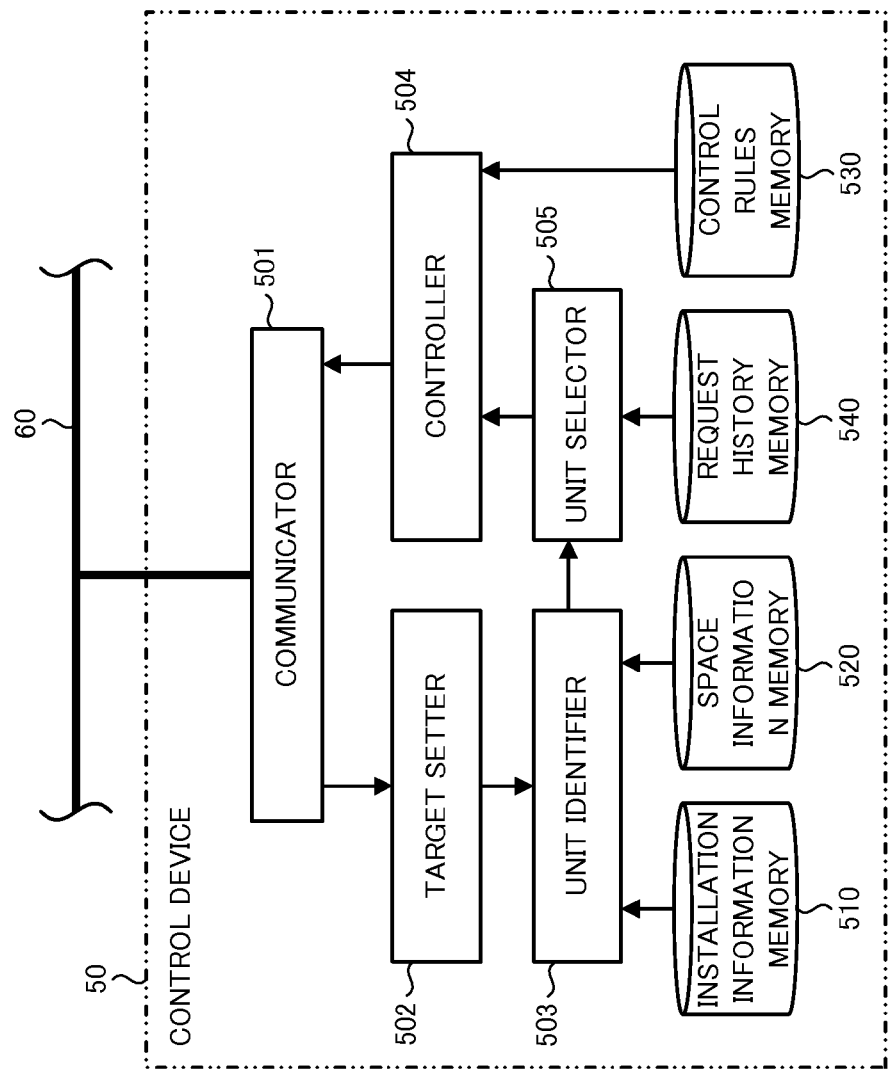
FIG. 12 is a block diagram showing the functions of the control device according to Embodiment 2.

The control device 50 according to this embodiment is different from the control device 50 according to Embodiment 1 in that a history of requests from multiple users is recorded. The control device 50 according to this embodiment comprises, as shown in FIG. 12, a unit selector 505 and a request history memory 540.

The unit selector 505 makes reference to the request history memory 540. Then, the unit selector 505 selects the indoor unit 23 that can fulfill many requests simultaneously from among the indoor units 23 and 24 identified by the unit identifier 503. The unit selector 505 notifies the controller 504 that the indoor unit 23 is selected.

The request history memory 540 stores request history 541 including requests from multiple users. Each request is stored in the request history memory 540 for a specific time period. The request history 541 is data associating a target location 542, a user request 543, a target environment 544, and a registration time 545 with each other as shown in FIG. 13.

The target location 542 presents the location of the user U1 to U4 who has entered the user request 543 into the portable terminal 40. The user request 543 is, for example, a request such as "warmer" and "cooler." The target environment 544 is a target environment for fulfilling the user request 543. The registration time 545 presents the time the user request 543 is registered at the request history memory 540. FIG. 14 shows the details of the user requests 543 and the locations of the users U1 to U4 who have entered the user requests 543.

Subsequently, a series of processing executed by the control device 50 will be described using the FIG. 15.

As shown in FIG. 15, following the unit identification procedure (Step S3), the unit selector 505 reads the request history 541 from the request history memory 540 (Step S51).

Then, the unit selector 505 determines whether the combination of the request received in the Step S1 and the target location set in the Step S2 is registered at the request history memory 540 (Step S52).

If the combination is registered (Step S52; Yes), the unit selector 505 advances the processing to the Step S4. Thus, duplicated registration of the same combination at the request history memory 540 is prevented.

On the other hand, if the combination is not registered (Step S52; No), the unit selector 505 selects the indoor unit having the smallest number of contradictory requests within the air-conditioned air reachable range (Step S53). For example, a request "warmer" and a request "cooler" shown in FIG. 13 are contradictory because it is difficult to realize their target environments simultaneously.

However, there are three requests within the reachable range of the air-conditioned air from the indoor unit 23 and there are no contradictory requests. Furthermore, there is one request within the reachable range of the air-conditioned air from the indoor unit 24 and there are no contradictory requests with regard to the indoor unit 24, either. Therefore, the indoor units 23 and 24 identified in the unit identification procedure are both selected in the Step S53.

Then, the unit selector 505 determines whether multiple indoor units are selected in the Step S53 (Step S54). If multiple indoor units are not selected (Step S54; No), the unit selector 505 advances the processing to Step S56.

On the other hand, if multiple indoor units are selected (Step S54; Yes), the unit selector 505 selects the indoor unit having the largest number of agreeing requests within the air-conditioned air reachable range (Step S55).

For example, the three requests made within the reachable range of the air-conditioned air from the indoor unit 23 are all "warmer" and agree. On the other hand, there is one request made within the reachable range of the air-conditioned air from the indoor unit 24. Therefore, the unit selector 505 selects the indoor unit 23.

Then, the unit selector 505 updates the request history 541 (Step S56). More specifically, the unit selector 505 adds to the request history 541 row data including the request received in the Step S1 and the target location and target environment set in the Step S2 along with the current time. Furthermore, the unit selector 505 deletes from the data included in the request history 541 the row data including the registration time 545 prior to the current time by a given time period or more. The given time period is, for example, 15 minutes.

As described above, the control device 50 according to this embodiment makes a larger number of users overall feel more comfortable compared with the control device 50 according to Embodiment 1.

Generally, when contradictory requests are sent to the control device or the like from multiple users present around one air-conditioning unit, the request from some user is fulfilled and the other users feel less comfortable in many cases. Alternatively, the requests from the users are all ignored and the operation is stopped, whereby all users feel less comfortable in some cases.

However, the control device 50 according to this embodiment controls the indoor units 21 to 24 so as to fulfill as many requests as possible, whereby the users U1 to U4 are expected to feel more comfortable.

Furthermore, the request history memory 540 according to this embodiment prevents duplicated registration of the same combination of a target location 542 and a user request 543. Furthermore, the data including the user request 543 and the like are deleted after stored in the request history memory 540 for a given time period.

Consequently, the user who has not become comfortable enough after one control operation can repeatedly resend his request to control the air-conditioning unit until he feels comfortable. On the other hand, the user who has become comfortable does not need to resend his request, whereby the indoor units 21 to 24 do not excessively repeat the air conditioning operation. Therefore, the users U1 to U4 can maintain the surrounding air at least in a state that does not make them feel uncomfortable.

Furthermore, when a request that is not stored in the request history 541 is sent from the users U1 to U4, the control device 50 executes control for fulfilling the request. However, when a request that is stored in the request history 541 is resent, the control device 50 does not execute the control for fulfilling the request again. Thus, when multiple users U1 to U4 each send similar requests in a short time, excessive air conditioning operation can be prevented. Then, reduction in the power consumption is expected.

Embodiments of the present disclosure are described above. The present disclosure is not confined to the above embodiments.

The control device 50 according to the above-described embodiments receives requests from the portable terminal 40. This is not restrictive. For example, it is possible that the user sends a request to the control device 50 using a device having its location information preset and installed at a given location. Furthermore, it is possible that the indoor units 21 to 24 calculate the degree of uncomfortableness based on the temperature, humidity, brightness, carbon dioxide concentration, and the like measured by multiple sensors installed in the indoor space A1 and send a request to the control device 50.

Furthermore, following the Step S31 (FIG. 9), the unit identifier 503 can exclude the indoor unit having the installation position 514 of which the distance from the target location is obviously longer. For example, the unit identifier 503 can exclude the indoor units 21 and 22 of which the above distances are larger than a given threshold and then execute the processing of the Step S32 and subsequent steps. Consequently, when there are many indoor units or the indoor space A1 is significantly large, the calculation workload can be reduced.

Furthermore, the controller 504 selects the indoor unit of which the installation position 514 is near the target location in the Step S48 (FIG. 10). This is not restrictive. For example, the controller 504 can estimate increase in the power consumption of each of the indoor units 21 to 24 based on the states of the indoor units 21 to 24 and select the indoor unit of which the estimated increase is the smallest.

Generally, the energy consumption of an indoor unit in air conditioning operation is increased more to lower a relatively low set temperature by 1° C. than to lower a relatively high set temperature by 1° C. Therefore, the controller 504 can select an indoor unit of which the current set temperature is high in lowering the set temperature.

Furthermore, the controller 504 according to this embodiment selects and controls one indoor unit 23 based on increase in the power consumption of the indoor units 21 to 24. This is not restrictive. For example, the controller 504 can select and simultaneously control multiple indoor units 23 and 24 based on increase in the power consumption of the entire control system 100. More specifically, the indoor unit 23 can discharge the air-conditioned air to the target location with the air from the indoor unit 24 used as an air curtain.

Furthermore, the data included in the request history 541 according to the above-described Embodiment 2 are deleted after a given time period has elapsed since the registration. However, the data can be deleted after the control for fulfilling the request is executed a given number of times or more. Furthermore, the data can be deleted when the user enters cancellation of the request into the portable terminal 40.

Furthermore, the requests "cooler" and "warmer" are made by the users by way of example. The requests can be, for example, "humid (dehumidification)" or "dry (humidification)" and "stagnant air (air cleaning)." The control rules memory 530 prestores the control rules for fulfilling these requests in accordance with the request. Here, "humid" and "dry" are contradictory requests.

Furthermore, in the above-described Embodiment 2, the indoor units 23 and 24 are selected in the Step S53 (see FIG. 15), the indoor unit 23 is selected in the Step S55, and the indoor unit 23 is selected in the Step S46 (see FIG. 10) in this order of execution. However, these selection steps can be executed in a different order. Furthermore, any of the indoor units 21 to 24 can be selected by comparing the evaluation values calculated with an evaluation function.

Furthermore, the controller 504 and unit selector 505 are functionally separated for understanding of the explanation. However, the controller 504 can include the function of the unit selector 505.

Furthermore, the portable terminal 40 can display to the user U1 and the like the reachable ranges of the air-conditioned air discharged from the indoor units 23 and 24 identified in the unit identification procedure.

The function of the control device 50 according to the above-described embodiments can be realized by dedicated hardware or by a conventional computer system.

For example, the program 58 stored in the auxiliary storage 53 can be saved and distributed on a computer-readable non-transitory recording medium such as a flexible disk, CD-ROM (compact disk read only memory), DVD (digital versatile disk), and MO (magneto-optical disk) and installed on a computer to configure a device executing the above-described procedures.

Alternatively, the program 58 can be saved in a disk device of a given server device on a communication network such as the Internet and, for example, be superimposed on carrier waves and downloaded on a computer.

Furthermore, the program 58 can be activated and executed to achieve the above-described procedures while being transferred via a network such as the Internet.

Moreover, with the program 58 being executed in whole or in part on a server device, a computer can execute the program 58 while transmitting/receiving information regarding the processing via a network so as to achieve the above-described procedures.

Moreover, when the above-described functions are realized in part by an OS (operating system) or by cooperation of an OS and application programs, only the non-OS part can be saved and distributed on a medium or downloaded on a computer.

Furthermore, the means for realizing the function of the control device 50 is not restricted to software and can be realized in part or entirely by dedicated hardware (a circuit or the like).

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The control device, control system, control method, and program of the present disclosure are suitable for indoor environment conditioning systems

REFERENCE SIGNS LIST

100 Control system
20 Outdoor unit
21 to 26 Indoor unit
31 to 33 Operation terminal
40 Portable terminal
50 Control device
51 Processor
52 Main storage
53 Auxiliary storage
54 Interface
55 Inputter
56 Outputter
57 Internal bus
58 Program
501 Communicator
502 Target setter
503 Unit identifier
504 Controller
505 Unit selector
510 Installation information memory
511 Installation information
512 Unit ID
513 Unit class
514 Installation position
515 Installation direction
520 Space information memory
521 Space information
523 Conditioning space
530 Control rules memory
531 Control rule
532 Priority rank
533 Control pattern
534 Associated pattern
535 Execution condition
540 Request history memory
541 Request history
542 Target location
543 User request
544 Target environment
545 Registration time
60 Communication network
U1 to U4 User

The invention claimed is:

1. A control device for controlling a plurality of equipment items for conditioning environment in a room, comprising:
a first storage configured to associate and store as installation information identification information for identifying the equipment items, a position in the room at which the equipment item is installed, a direction in which the equipment item is installed, and a class for classifying the space in which the environment can be conditioned by the equipment item;
a setter configured to set a target location in the room and a target environment at the target location;
an identifier configured to identify the equipment item that can condition the environment at the target location based on the installation information; and
a controller configured to select one control pattern based on power consumption when control according to each control pattern is executed from among a plurality of control patterns for controlling the equipment item identified by the identifier so as to condition the environment at the target location to the target environment and control the equipment item identified by the identifier with the selected control pattern;
a second storage configured to associate and store, for each of the plurality of control patterns, a priority rank given in an ascending order of increase in the power consumption when the control according to the control pattern is executed and an execution condition defining a state of the equipment item as a condition for executing the control according to the control pattern; and
a detector configured to detect the state of the equipment item identified by the identifier, wherein
the controller selects from among the plurality of control patterns the control pattern having the highest priority rank among the control patterns the control according to which becomes executable when the state detected by the detector satisfies the execution condition.

2. The control device according to claim 1, wherein the equipment items are air-conditioning units discharging air-conditioned air to condition the environment, and
the controller selects a control pattern for executing the control minimizing increase in the power consumption from among the plurality of control patterns.

3. The control device according to claim 1, wherein the controller selects the equipment item based on the power consumption when each of the equipment items is controlled so as to condition the environment at the target location to the target environment from among the plurality of equipment items identified by the identifier and controls the selected equipment item.

4. The control device according to claim 1, wherein the controller selects the equipment item of which distance from the target location is the shortest from among the plurality of equipment items identified by the identifier and controls the selected equipment item.

5. The control device according to claim 1, wherein the second storage associates and stores the priority rank, the control pattern having the priority rank, and an associated pattern presenting details of control executed in association with the control according to the control pattern, and
the controller controls the equipment item according to the control pattern and the associated pattern associated with the control pattern.

6. A control device for controlling a plurality of equipment items for conditioning environment in a room, comprising:
a first storage configured to associate and store as installation information identification information for identifying the equipment items, a position in the room at which the equipment item is installed, a direction in which the equipment item is installed, and a class for classifying the space in which the environment can be conditioned by the equipment item;
a setter configured to set a target location in the room and a target environment at the target location;
an identifier configured to identify the equipment item that can condition the environment at the target location based on the installation information; and
a controller configured to select one control pattern based on power consumption when control according to each control pattern is executed from among a plurality of control patterns for controlling the equipment item identified by the identifier so as to condition the environment at the target location to the target environment and control the equipment item identified by the identifier with the selected control pattern;
a second storage configured to store the target locations and target environments set by the setter in the past, wherein
the controller comprises:
a first selector configured to select from among the plurality of equipment items identified by the identifier the equipment item for which the smallest number of target environments contradictory to the current target environment were set in the past among the target environments in the space in which the environment can be conditioned by each of the equipment items, and
a second selector configured to select from among the plurality of equipment items selected by the first selector the equipment item for which the largest number of target environments agreeing to the current target environment were set in the past among the target environments in the space in which the environment can be conditioned by each of the equipment items, and
the equipment item selected by the first selector and second selector is controlled.

7. The control device according to claim 6, wherein
the third storage stores the target locations and target environments set in a given time period of the past, and
the controller controls the equipment item so as to condition the environment at the target location to the target environment only when the target location and target environment that will newly be stored in the third storage are set by the setter.

8. A control system, comprising:
a plurality of equipment items for conditioning the environment in a room; and
a control device for controlling a plurality of equipment items for conditioning environment in a room comprising
a first storage configured to associate and store as installation information identification information for identifying the equipment items, a position in the room at which the equipment item is installed, a direction in which the equipment item is installed, and a class for classifying the space in which the environment can be conditioned by the equipment item,
a setter configured to set a target location in the room and a target environment at the target location,
an identifier configured to identify the equipment item that can condition the environment at the target location based on the installation information,
a controller configured to select one control pattern based on power consumption when control according to each control pattern is executed from among a plurality of control patterns for controlling the equipment item identified by the identifier so as to condition the environment at the target location to the target environment and control the equipment item identified by the identifier with the selected control pattern,
a second storage configured to associate and store, for each of the plurality of control patterns, a priority rank given in an ascending order of increase in the power consumption when the control according to the control pattern is executed and an execution condition defining a state of the equipment item as a condition for executing the control according to the control pattern, and
a detector configured to detect the state of the equipment item identified by the identifier, wherein
the controller selects from among the plurality of control patterns the control pattern having the highest priority rank among the control patterns the control according to which becomes executable when the state detected by the detector satisfies the execution condition.

9. A control method for controlling a plurality of equipment items for conditioning environment in a room, comprising:
setting a target location in the room and a target environment at the target location;
identifying the equipment item that can condition the environment at the target location based on installation information for associating identification information for identifying the equipment items, a position in the room at which the equipment item is installed, a direction in which the equipment item is installed, and a class for classifying the space in which the environment can be conditioned by the equipment item;
selecting one control pattern based on power consumption when control according to each control pattern is executed from among a plurality of control patterns for controlling the identified equipment item so as to condition the environment at the target location to the target environment and controlling the identified equipment item with the selected control pattern;
associating, and storing, for each of the plurality of control patterns, a priority rank given in an ascending order of increase in the power consumption when the control according to the control pattern is executed and an execution condition defining a state of the equipment item as a condition for executing the control according to the control pattern;
detecting the state of the identifying of the equipment item; and
selecting from among the plurality of control patterns the control pattern having the highest priority rank among the control patterns the control according to which becomes executable when the state detected by the detector satisfies the execution condition.

10. A non-transitory computer-readable recording medium storing a program for controlling a plurality of equipment items for conditioning environment in a room, causing a computer to execute procedures of:
setting a target location in the room and a target environment at the target location;
identifying the equipment item that can condition the environment at the target location based on installation information for associating identification information for identifying the equipment items, a position in the room at which the equipment item is installed, a direction in which the equipment item is installed, and a class for classifying the space in which the environment can be conditioned by the equipment item;

selecting one control pattern based on power consumption when control according to each control pattern is executed from among a plurality of control patterns for controlling the identified equipment item so as to condition the environment at the target location to the target environment and controlling the identified equipment item with the selected control pattern;

associating, and storing, for each of the plurality of control patterns, a priority rank given in an ascending order of increase in the power consumption when the control according to the control pattern is executed and an execution condition defining a state of the equipment item as a condition for executing the control according to the control pattern;

detecting the state of the identifying of the equipment item; and selecting from among the plurality of control patterns the control pattern having the highest priority rank among the control patterns the control according to which becomes executable when the state detected by the detector satisfies the execution condition.

11. A control system, comprising:
a plurality of equipment items for conditioning the environment in a room; and
a control device for controlling a plurality of equipment items for conditioning environment in a room, comprising:
  a first storage configured to associate and store as installation information identification information for identifying the equipment items, a position in the room at which the equipment item is installed, a direction in which the equipment item is installed, and a class for classifying the space in which the environment can be conditioned by the equipment item;
  a setter configured to set a target location in the room and a target environment at the target location;
  an identifier configured to identify the equipment item that can condition the environment at the target location based on the installation information; and
  a controller configured to select one control pattern based on power consumption when control according to each control pattern is executed from among a plurality of control patterns for controlling the equipment item identified by the identifier so as to condition the environment at the target location to the target environment and control the equipment item identified by the identifier with the selected control pattern;
  a second storage configured to store the target locations and target environments set by the setter in the past, wherein
  the controller comprises:
    a first selector configured to select from among the plurality of equipment items identified by the identifier the equipment item for which the smallest number of target environments contradictory to the current target environment were set in the past among the target environments in the space in which the environment can be conditioned by each of the equipment items, and
    a second selector configured to select from among the plurality of equipment items selected by the first selector the equipment item for which the largest number of target environments agreeing to the current target environment were set in the past among the target environments in the space in which the environment can be conditioned by each of the equipment items, and
  the equipment item selected by the first selector and second selector is controlled.

12. A control method for controlling a plurality of equipment items for conditioning environment in a room, comprising:
setting a target location in the room and a target environment at the target location;
identifying the equipment item that can condition the environment at the target location based on installation information for associating identification information for identifying the equipment items, a position in the room at which the equipment item is installed, a direction in which the equipment item is installed, and a class for classifying the space in which the environment can be conditioned by the equipment item;
selecting one control pattern based on power consumption when control according to each control pattern is executed from among a plurality of control patterns for controlling the identified equipment item so as to condition the environment at the target location to the target environment and controlling the identified equipment item with the selected control pattern;
storing the target locations and target environments set by the setter in the past;
selecting from among the plurality of equipment items identified by the identifier the equipment item for which the smallest number of target environments contradictory to the current target environment were set in the past among the target environments in the space in which the environment can be conditioned by each of the equipment items;
selecting, from among the plurality of equipment items selected, the equipment item for which the largest number of target environments agreeing to the current target environment were set in the past among the target environments in the space in which the environment can be conditioned by each of the equipment items; and
controlling the equipment item selected.

13. A non-transitory computer-readable recording medium storing a program for controlling a plurality of equipment items for conditioning environment in a room, causing a computer to execute procedures of:
setting a target location in the room and a target environment at the target location;
identifying the equipment item that can condition the environment at the target location based on installation information for associating identification information for identifying the equipment items, a position in the room at which the equipment item is installed, a direction in which the equipment item is installed, and a class for classifying the space in which the environment can be conditioned by the equipment item;
selecting one control pattern based on power consumption when control according to each control pattern is executed from among a plurality of control patterns for controlling the identified equipment item so as to condition the environment at the target location to the target environment and controlling the identified equipment item with the selected control pattern;
storing the target locations and target environments set by the setter in the past;
selecting from among the plurality of equipment items identified by the identifier the equipment item for which the smallest number of target environments contradictory to the current target environment were set in the past among the target environments in the space in which the environment can be conditioned by each of the equipment items;

selecting, from among the plurality of equipment items selected, the equipment item for which the largest number of target environments agreeing to the current target environment were set in the past among the target environments in the space in which the environment can be conditioned by each of the equipment items; and controlling the equipment item selected.

* * * * *